(12) United States Patent
Bychkovsky et al.

(10) Patent No.: US 11,568,271 B1
(45) Date of Patent: Jan. 31, 2023

(54) MACHINE LEARNING IN RESOURCE-CONSTRAINED ENVIRONMENTS

(71) Applicant: Meta Platforms, Inc., Menlo Park, CA (US)

(72) Inventors: Vladimir Leonid Bychkovsky, Cambridge, MA (US); James Cipar, Arlington, MA (US); Saurav Mohapatra, Lexington, MA (US); Alvin F. Wen, Lexington, MA (US); Lili Hu, Amherst, MA (US)

(73) Assignee: Meta Platforms, Inc., Menlo Park, CA (US)

( * ) Notice: Subject to any disclaimer, the term of this patent is extended or adjusted under 35 U.S.C. 154(b) by 1171 days.

(21) Appl. No.: 16/012,696

(22) Filed: Jun. 19, 2018

(51) Int. Cl.
　　*G06N 20/00*　　(2019.01)
　　*G06N 5/00*　　(2006.01)
　　*G06F 8/65*　　(2018.01)

(52) U.S. Cl.
　　CPC .............. *G06N 5/003* (2013.01); *G06F 8/65* (2013.01); *G06N 20/00* (2019.01)

(58) Field of Classification Search
　　CPC .......... G06N 3/08; G06N 3/088; G06N 20/00; G06N 20/20
　　See application file for complete search history.

(56) References Cited

U.S. PATENT DOCUMENTS

| | | | |
|---|---|---|---|
| 2015/0024367 A1* | 1/2015 | Singh | G06K 9/6292 434/362 |
| 2019/0109926 A1* | 4/2019 | Hotchkies | H04L 67/327 |
| 2019/0355471 A1* | 11/2019 | Peng | G06N 3/08 |

* cited by examiner

*Primary Examiner* — Shirley X Zhang
(74) *Attorney, Agent, or Firm* — Baker Botts L.L.P.

(57) ABSTRACT

In one embodiment, a method includes receiving a request to determine whether to perform an action, wherein the action is based on one or more feature values, generating a prediction of whether to perform the action, wherein the prediction is generated using a machine-learning model that is trained based on the feature values, a heuristic value based on the feature values, and one or more feedback scores based on corresponding past predictions generated by the machine-learning model, where the heuristic value indicates whether to perform the action based on one or more predetermined conditions that are based on the feature values, performing the action when the prediction indicates that the action is to be performed, receiving a feedback score that indicates a level of effectiveness of the prediction, and updating the machine-learning model based on the feedback score, the feature values, and the heuristic value.

21 Claims, 6 Drawing Sheets

MACHINE LEARNING IN RESOURCE-CONSTRAINED ENVIRONMENTS

TECHNICAL FIELD

This disclosure generally relates techniques for using machine learning to make predictions in resource-constrained computational environments.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, an efficient and lightweight online machine learning engine may be used to augment or replace existing heuristics used by servers that handle a high number of queries or other operations per second (high QPS servers). Heuristics may be simple rules that can be used to quickly make decisions, and existing servers may use heuristics to make decisions such as whether to store a data item in a cache, when to evict a data item from a cache, which data to initialize or cache, and so on. Portions of a server's program code that use heuristics may be modified to use predictions generated by the online machine-learning engine instead of or in addition to the heuristics. The online machine-learning engine may use reinforcement learning to train a machine-learning model based on feedback on predictions that are made during server operation.

In particular embodiments, server program code that uses a heuristic to decide whether to perform an action may be modified by adding invocations of two functions provided by the machine learning engine: a prediction function, which uses the machine-learning model to generate a prediction based on input features, and a feedback function, which updates the model based on feedback about the results of previous predictions. The server program code may be modified to use the result returned by the prediction function to decide whether to perform the action. The input features provided to the prediction function may be the same as or similar to the inputs used by the heuristic, and the result produced by the heuristic may also be provided as input to the prediction function. The result of the prediction function may be used to determine whether to perform the action that was associated with the heuristic.

In particular embodiments, the server program code may assess the effectiveness of the prediction by determining whether a result of the action was used by the server if the action was performed, or not used by the server if the action was not performed. For example, the server may determine whether there were any cache hits for an object that was admitted to a cache based on a prediction, or may determine whether objects that were initialized based on a prediction were actually used. The assessment may be represented as a Boolean value, e.g., true if the action was performed and the result was used, or a numeric score indicating a degree of effectiveness. The assessment may be passed to the model as training data by invoking the feedback function with the assessment value or score as an argument. The model may be updated online, e.g., on the server while the server is operational, or offline, e.g., on a different computer system. Offline updates to the model may be propagated back to the server using low-overhead upgrade operations so that the server's performance is not adversely affected.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
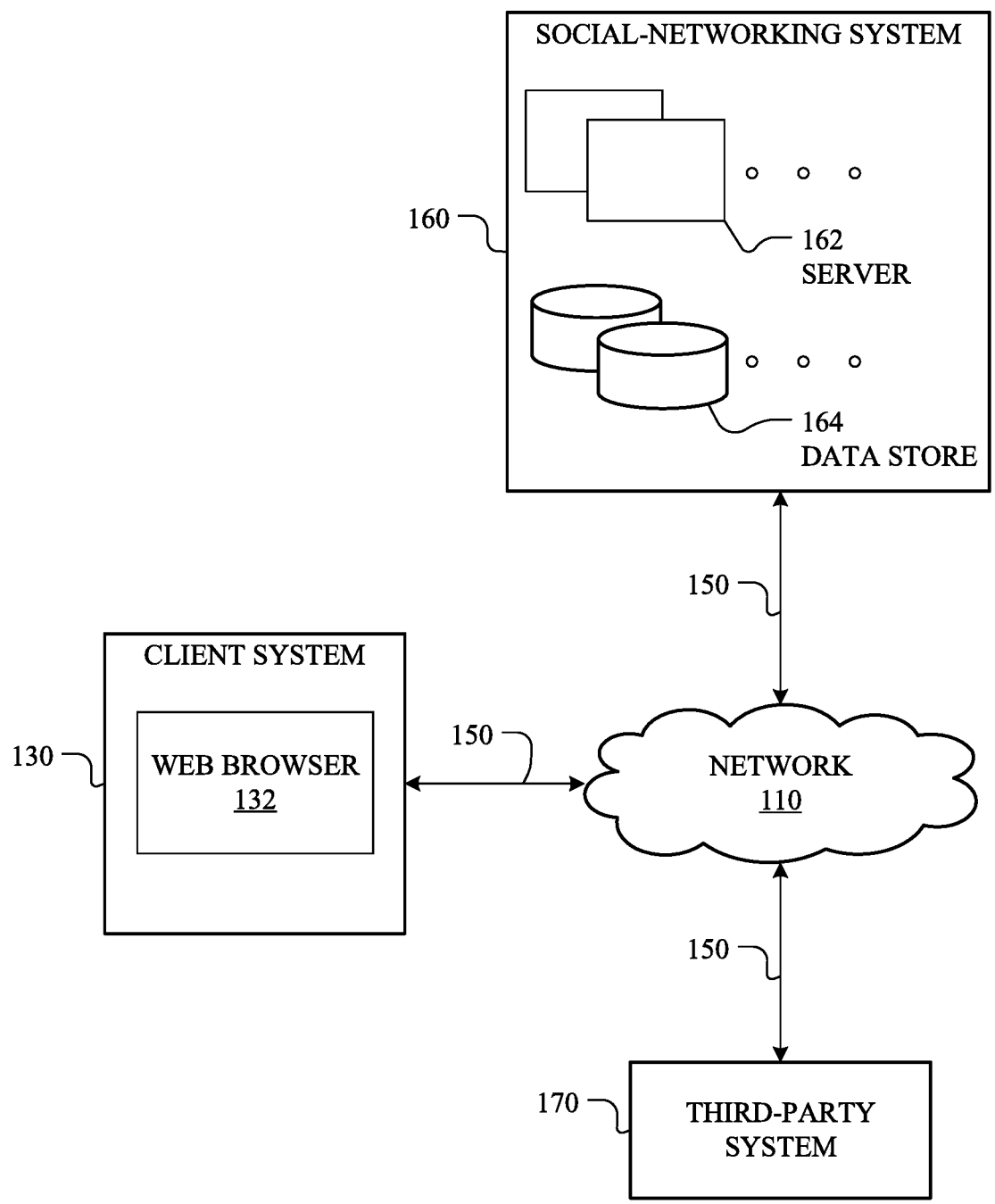
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, an efficient and lightweight online machine learning engine may be used to augment or replace existing heuristics used by servers that handle a high number of queries or other operations per second (high QPS servers). Heuristics may be simple rules that can be used to quickly make decisions, and existing servers may use heuristics to make decisions such as whether to store a data item in a cache, when to evict a data item from a cache, which data to initialize or cache, and so on. Portions of a server's program code that use heuristics may be modified to use predictions generated by the online machine-learning engine instead of or in addition to the heuristics. The online machine-learning engine may use reinforcement learning to train a machine-learning model based on feedback received for predictions made during server operation.

In particular embodiments, server program code that uses a heuristic to decide whether to perform an action may be modified by adding invocations of two functions provided by the machine learning engine: a prediction function, which uses the machine-learning model to generate a prediction based on input features, and a feedback function, which updates the model based on feedback about the results of previous predictions. The server program code may be modified to use the result returned by the prediction function to decide whether to perform the action. The input features provided to the prediction function may be the same as or similar to the inputs used by the heuristic, and the result produced by the heuristic may also be provided as input to the prediction function. The result of the prediction function may be used to determine whether to perform the action that was associated with the heuristic.

In particular embodiments, the server program code may assess the effectiveness of the prediction by determining whether a result of the action was used by the server if the action was performed, or not used by the server if the action was not performed. For example, the server may determine whether there were any cache hits for an object that was admitted to a cache based on a prediction, or may determine whether objects that were initialized based on a prediction were actually used. The assessment may be represented as a Boolean value, e.g., true if the action was performed and the result was used, or a numeric score indicating a degree of effectiveness. The assessment may be passed to the model as training data by invoking the feedback function with the assessment value or score as an argument. The information used to make the prediction on which the feedback is based, including the feature values and the result produced by the heuristic, may also be passed to or otherwise made available to the model as training data. The model may be updated online, e.g., on the server while the server is operational, or offline, e.g., on a different computer system. Offline updates to the model may be propagated back to the server using low-overhead upgrade operations so that the server's performance is not adversely affected.

In particular embodiments, a server may receive a request to determine whether to perform an action that is based on one or more feature values. The server may generate a prediction of whether to perform the action. The prediction may be generated using a machine-learning model that is trained based on the feature values, a heuristic value based on the feature values, and one or more feedback scores based on corresponding past predictions generated by the machine-learning model. The heuristic value may indicate whether to perform the action based on one or more predetermined conditions that are based on the feature values. The server may perform the action when the prediction indicates that the action is to be performed, receive a feedback score that indicates a level of effectiveness of the prediction, and update the machine-learning model based on the feedback score, the feature values, and the heuristic value.

High query-per-second ("QPS") servers may use heuristic techniques to make decisions about how to efficiently process data. For example, servers may use heuristics to make decisions such as whether to store a data item in a cache, when to evict a data item from a cache, when to prepare (e.g., materialize) data for use, and so on. Heuristic techniques may provide results quickly, but sacrifice other characteristics that may be useful, such as accuracy and completeness. The heuristics used in high QPS servers may be based on experiments with data samples, rules of thumb, or intuition, and may be used because more accurate and complete solutions would consume too many computational resources, or are unknown. Heuristics may involve comparing run-time quantities, e.g., the rate of incoming requests, the amount of memory used by a data item, the amount of free memory in the cache, or how frequently a particular type of data item is requested, to threshold values determined by experimentation. Such heuristics may be created manually, e.g., based on experiments or benchmarks, by system designers or implementors and are not often changed. Heuristics may thus become less useful or even harmful over time, since usage patterns may change over time, thereby invalidating the assumptions made by the heuristics.

In particular embodiments, the integration of the online machine learning engine with the server may result in predictions quickly becoming available to the server, which may evaluate the correctness of the predictions and provide feedback as to whether the predictions are correct to tune the heuristics. The online machine-learning engine may generate predictions using relatively few computational resources so that it does not substantially reduce server performance. The online machine-learning engine may log samples of the heuristic inputs and outputs to an offline system that may use reinforcement learning and other machine-learning techniques to refine the model used by the online machine-learning engine. The machine-learning model provided by the engine may replace decision heuristics that may have been constructed based on information about a system but may be difficult to modify, and further may not adapt automatically to changes, such as changes in system behavior.

In particular embodiments, the machine learning engine may have a programming interface that includes a prediction function and a feedback function. The server program code may be modified to invoke the prediction function, e.g., at points where heuristics are used, and use the prediction function's output in place of heuristic results. The existing heuristic program code may be in a function, referred to herein as a heuristic function. When the server program code has been modified, the prediction function may be invoked by the server to request that the lightweight engine make a prediction using its machine-learning model based on feature values provided as input to the prediction function. The prediction function may return the prediction, which may be a Boolean true or false value, or a numeric value, as a result. The prediction function may use the input and output values of the existing heuristic program code or function as input to the machine learning model. Initially, e.g., the first time it is invoked, or when the machine learning model has not yet been sufficiently trained, the output of the prediction function may be based on (e.g., the same as or similar to) the output of the heuristic program code. When the model is sufficiently trained based on feedback about whether the predictions are correct (as provided by the feedback function), the prediction function's output may differ from that of the heuristic.

In particular embodiments, the feedback function may be invoked by the server program code to indicate whether the prediction was correct. For example, if the feedback function is invoked after the corresponding prediction function with no intervening invocations of the prediction or feedback functions, then the input to the feedback function may be a true or false value indicating whether the prediction was correct. In other examples, the input to the feedback function may be the same as the input to the prediction function, or at least information sufficient to match the feedback function invocation to the prediction function invocation. The feedback function may create a feedback loop in which the model is trained via reinforcement learning.

As an example, a server may have existing heuristic program code that determines whether to cache an object such as a web page or image. For example, the heuristic may be that the object is cached if the object's size is less than a threshold value, e.g., 1 megabyte. The heuristic program code for this example may be as follows:
   if object.size( )<threshold then
      admitToCache(object).

The heuristic may make a decision based on inputs, referred to herein as feature values, and return a true or false value accordingly. In this example, the object size and threshold are feature values. The heuristic determines a result, which in this example is the result of the condition object.size( )<threshold. If the result is true, then the object is admitted to the cache.

In particular embodiments, the server program code may be modified to invoke a prediction function and use the result of the prediction function to decide whether to perform an action (such as admitting an object to a cache) instead of the result of the heuristic. That is, the prediction decision result may be substituted for the heuristic decision result in the server program code. The prediction function may use the heuristic program code's input and result as input features, which the prediction function may pass to the machine-learning model. The machine-learning model may produce a result that may differ from the heuristic result. As an example, the server program code may be modified to use the prediction function to determine whether to admit an object to the cache as follows:
   if object.size( )<threshold then
      heuristicResult=true
   else
      heuristicResult=false
   predictionResult=prediction(object, object.size( ) threshold, heuristicResult)
   if predictionResult=true then
      admitToCache(object).

In the example above, the heuristic is evaluated to determine its result, referred to as heuristicResult. The prediction function is invoked with the object, the object's size (which is an attribute of the object), the threshold size, and the heuristic's result as input features. These input features may be passed to the machine-learning model, which may use them to make a prediction. The prediction function may return the prediction to the server program code, e.g., in the variable named predictionResult. The server program code may use the predictionResult variable to decide whether to admit the object to the cache.

In particular embodiments, a feedback function may be invoked by the server program code to provide feedback for training the model. The feedback function may be invoked subsequently to an invocation of the prediction function to provide feedback on the prediction generated in that invocation. The feedback function need not be invoked after every invocation of the prediction function. Instead, the prediction function may be invoked at times of the server's choosing, e.g., at times when the server is idle or lightly loaded. The prediction invocation to which a feedback invocation corresponds may be identified by, e.g., using a prediction identifier returned by the prediction function and passed as input to the feedback function, or other suitable technique. The input parameters to the feedback function may be similar to those of the prediction function, with an additional parameter that represents an assessment of the decision. This additional parameter may be a Boolean value, e.g., true to indicate that the prediction was correct or successful or false to indicate that the prediction was incorrect or unsuccessful, or a numeric value such as a score, e.g., 0 to indicate that the prediction was of low quality (e.g. incorrect or unsuccessful), 100 to indicate that the prediction was of high quality (e.g., correct or successful), or a value in between to indicate a partially-correct or partially-successful prediction.

For example, the server may determine that the cache admission prediction was correct if there has been at least one cache hit on the object since the prediction was made, or incorrect if there have been no cache hits on the object since the prediction was made. A score value may also be determined, e.g., based on a number of cache hits since the prediction was made. For example, if there have been at least 10 cache hits, the score may be 10, if there have been at least 20 cache hits, the score may be 20, and so on up to a maximum score such as 100. Other factors may also be include in the score, e.g., the rate of cache hits, in which case higher rates may result in higher scores and vice-versa. For example, the feedback function may be invoked by the server with the score as an input parameter to provide feedback for the most recent prediction as follows:

feedback(score).

As another example, the feedback function may be invoked by the server with a prediction identifier (received as an output value from a previous invocation of the prediction function) that identifies a particular prediction, and the score, as input:

feedback(predictionIdentifier, score).

In particular embodiments, the feedback information, e.g., the score, may be used to update the machine-learning model. The update operation may be performed online (e.g., in the server process) if the update does not use substantial computational resources. Alternatively or additionally, the feedback information may be logged or otherwise stored for subsequent use in an offline update operation (e.g., to be executed by a different computer system) so that the server's performance is not adversely affected by the update operation. The offline system, which may have significantly higher resources than the high QPS server, may provide further refinement of the heuristics and automatically update the machine learning model used in the high QPS server to further enhance the inferred heuristics based on the logged results. The updated model may be made available to the server at a suitable time or using a technique that does not adversely affect the server's performance, e.g., updating the model on the server using efficient upgrade operations. The online learning model may continually log results as they become available, and a feedback loop in which the online model is updated based on the refinements made by the offline system may repeatedly adjust the model based on the logged results. Prediction quality may thus improve progressively as more feedback is generated. Multiple high QPS servers can be used in a network connected in a feedback loop with the offline system. Each additional server that comes online may start from the current model being used in a "warm start" approach to take advantage of the updated model to date, including accumulated experience.

In particular embodiments, there may be a large number of different heuristics used by a server, many of which may be converted to predictions that use the prediction engine. Thus, the prediction engine may choose a subset of the heuristics for which feedback is to be used when updating the model. For updates performed online, the number of heuristics sampled (e.g., selected) may be relatively small, e.g., 10 or 100. The number of sampled heuristics may be larger for updates performed offline. There may be multiple features provided as input to each prediction and feedback invocation. Certain features may be more useful than others, so a subset of the features may be selected when making predictions and/or when updating the model.

In particular embodiments, the predictor/machine learning model may determine, through active learning, which heuristic to sample next. For example, a user may indicate which heuristics and/or features should be used to train the machine-learning model. The determined heuristic to sample next may be made available to the server. Particular embodiments may use a reinforcement learning model in which the results from the server are used to make predictions (e.g., should a photo have been cached given the number of hits for it). The reinforcement learning model may learn the system's characteristics. The online reinforcement learning model may log how correct its predictions were, and then adjust its model. This online reinforcement learning model may be useful when determining the correct decision is difficult, and for problems in which the correct decision changes over time.

Further, although the prediction functions have relatively low latency, if there are many heuristics and/or features, the prediction functions may be able to consume more computational resources than the server can provide while still processing queries at an acceptable rate. Thus, the prediction function invocations for one or more heuristics may, depending on factors such as the server load or the total number of heuristics, return the heuristic result, instead of invoking the machine-learning model to make a prediction.

In particular embodiments, a server may generate one or more online updates to the machine-learning model based on the feedback score, the feature values, and the heuristic value when a resource availability condition is satisfied, and update the machine-learning model based on the online updates. The online updates may be generated and used to update the model by the server while the server is performing other operations such as processing queries. The resource availability condition may be based on a minimum time interval between updates to the machine-learning model. For example, the local updates may be performed when the time between updates is greater than a minimum time interval such as 30 minutes, 1 hour, 24 hours, or other suitable interval. If new update is requested sooner than the time interval has elapsed after a previous update, then the new update may be deferred until the time interval has passed, or may be included with the next update that is performed after the time interval has passed.

The resource availability condition may be based a processor utilization level. For example, the local updates may be performed when the processor utilization level of the server is less than a threshold value, e.g., less than 5%, less than 10%, or less than another suitable number, for at least a threshold period of time, e.g., at least 1 minute, at least 5 minutes, or at least 30 minutes. The processor utilization level may be a percentage of processor cycles that are being utilized over a time period, or a number of jobs processed by the processor during a time period, or other type of utilization metric. The processor utilization may be for a single processor or for multiple processors in a server.

The resource availability condition may be based a number of processors on the computing device. For example, the local updates may be performed if the server has two or more processors. The number of processors condition may be combined with other conditions. For example, the local updates may be performed if the server has three or more processors and the utilization of all three processors has been below a threshold value for at least a threshold period of time. The minimum time interval may be added to this condition, e.g., so that the local updates are performed if the server has three or more processors, the utilization is below a threshold value, and the time since the previous update is greater than the minimum time interval between updates.

Figure 2A:
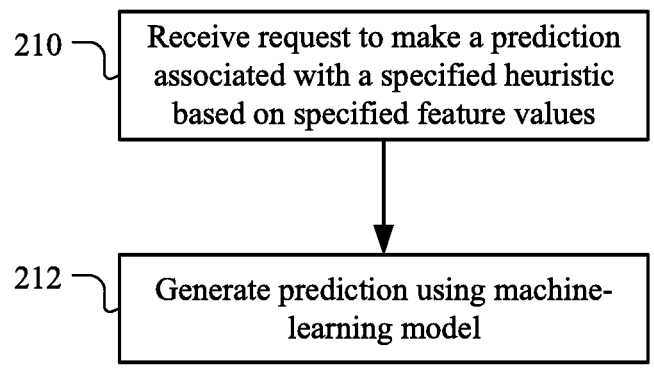
FIG. 2A illustrates an example method for making a prediction associated with a heuristic based on specified feature values.

In particular embodiments, the model may issue a query or perform an action twice and compare the results to determine which changes are deterministic. By monitoring changes in the result, particular embodiments may determine the materiality of those changes and determine whether to update the model accordingly. Accordingly, particular embodiments may identify which changes are deterministic and which changes are non-deterministic and update the model accordingly. In particular embodiments, heuristics may adapt to changing conditions. For example, in the case of a cache admission heuristic, if certain types of items are requested less frequently, the feedback can retrain the heuristic to reduce the likelihood of admitting such items without human intervention FIG. 2A illustrates an example method 201 for making a prediction associated with a heuristic based on specified feature values. The method 201 may be implemented by, for example, a prediction function and a machine-learning model, as described above. The method may begin at step 210, where the method may receive a request to make a prediction associated with a specified heuristic based on specified feature values. At step 212, the method may generate a prediction using machine-learning model.

Particular embodiments may repeat one or more steps of the method of FIG. 2A, where appropriate. Although this disclosure describes and illustrates particular steps of the method of FIG. 2A as occurring in a particular order, this disclosure contemplates any suitable steps of the method of FIG. 2A occurring in any suitable order. Moreover, although this disclosure describes and illustrates an example method for making a prediction associated with a heuristic based on specified feature values including the particular steps of the method of FIG. 2A, this disclosure contemplates any suitable method for making a prediction associated with a heuristic based on specified feature values including any suitable steps, which may include all, some, or none of the steps of the method of FIG. 2A, where appropriate. Furthermore, although this disclosure describes and illustrates particular components, devices, or systems carrying out particular steps of the method of FIG. 2A, this disclosure contemplates any suitable combination of any suitable components, devices, or systems carrying out any suitable steps of the method of FIG. 2A.

Figure 2B:
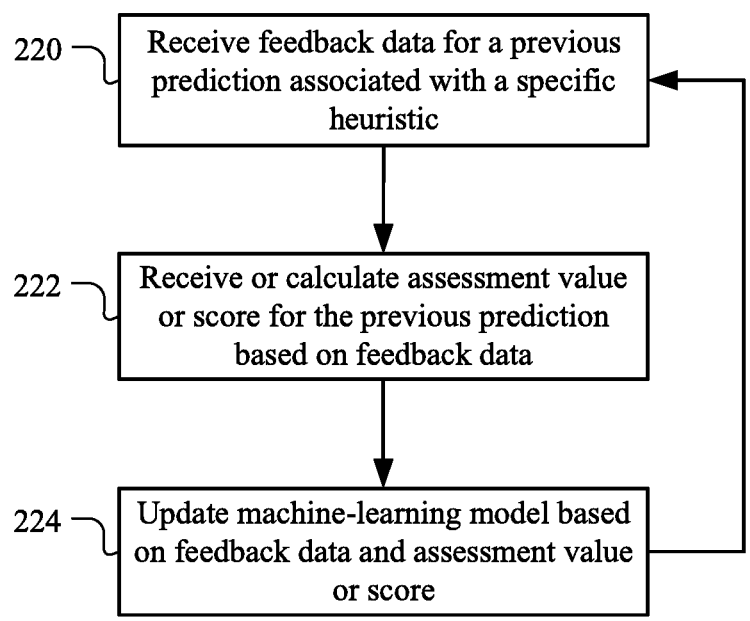
FIG. 2B illustrates an example method for updating a machine-learning model based on feedback data for a previous prediction.

FIG. 2B illustrates an example method 202 for updating a machine-learning model based on feedback data for a previous prediction. The method 202 may be implemented by, for example, a feedback function and a machine-learning model. as described above. The method may begin at step 220, where the method may receive feedback data for a previous prediction associated with a specific heuristic. At step 222, the method may receive or calculate assessment value or score for the previous prediction based on feedback data. At step 224, the method may update the machine-learning model based on feedback data and the assessment value or score. After step 224, the method may continue at step 220 by receiving further feedback, which may be for the same prediction or for different predictions. Particular embodiments may repeat one or more steps of the method of FIG. 2B, where appropriate.

Figure 3A:
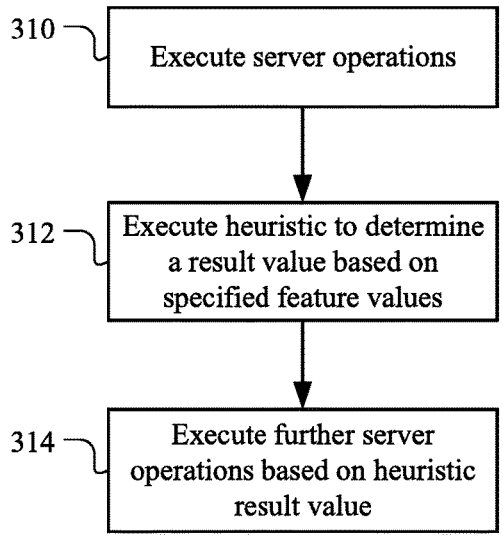
FIG. 3A illustrates an example method for using a heuristic to make a decision in a server.

FIG. 3A illustrates an example method 301 for using a heuristic to make a decision in a server. The method may begin at step 310, where the method may execute server operations, e.g., any operations that may be executed by server program code prior to heuristic program code that begins execution at step 312. At step 312, the method may execute the heuristic to determine a result value based on specified feature values. For example, the heuristic may be a probabilistic cache admission heuristic that admits an object of a given size to a cache with probability $e^{-size}$ (that is, e^(−size)). The feature value is the size of the object in this example. At step 314, the method may execute further server operations based on the heuristic result value, which is the probability calculated at step 312 in this example. Thus, step 314 may admit the object to the cache with the probability calculated at step 312. Particular embodiments may repeat one or more steps of the method of FIG. 3A, where appropriate.

Figure 3B:
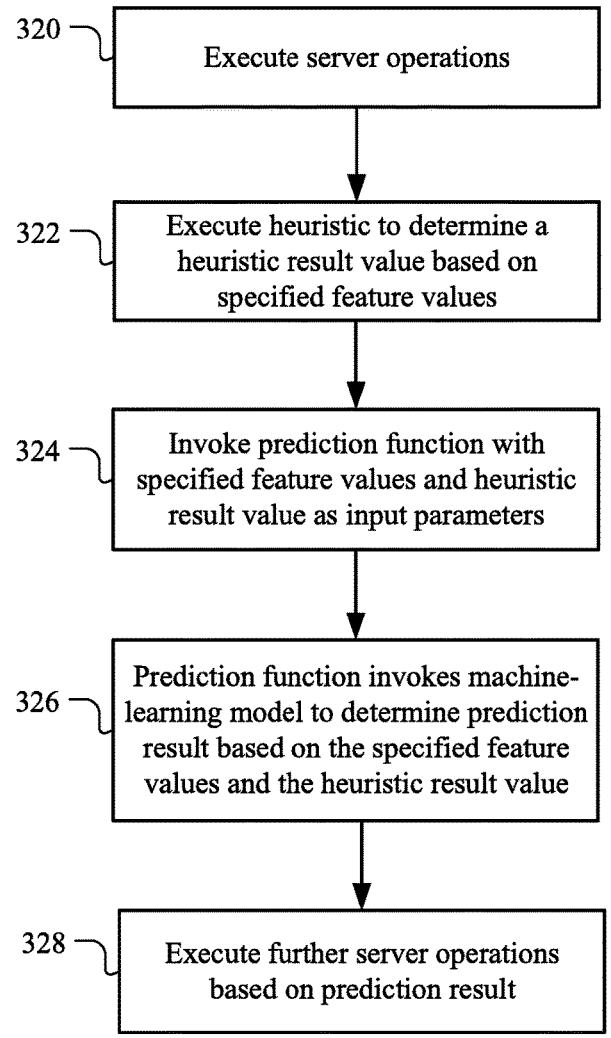
FIG. 3B illustrates an example method for using a prediction to make a decision associated with a heuristic in a server.

FIG. 3B illustrates an example method 302 for using a prediction to make a decision associated with a heuristic in a server. The method 302 may correspond to server program code that has been modified to use a prediction function. Server program code prior to such modification may correspond to the method 301 of FIG. 3A. The method may begin at step 320, where the method may execute server operations. In one example, step 320 may be the same as step 310 of FIG. 3A. At step 322, the method may execute a heuristic to determine a heuristic result value based on specified feature values. In one example, step 322 may be the same as step 312 of FIG. 3A, and may generate a queue admission probability based on an object size. At step 324, the method may invoke a prediction function with specified feature values and the heuristic result value as input parameters. At step 326, the method may execute the prediction function, which may invoke the machine-learning model to determine a prediction result based on the specified feature values and the heuristic result value. Step 326 may pass the specified feature values (e.g., the object size) and the heuristic result (e.g., the admission probability) to the machine-learning model. At step 328, the method may execute further server operations based on prediction result. For example, step 328 may admit the object to the cache with a probability returned by the machine-learning model as the prediction result. Particular embodiments may repeat one or more steps of the method of FIG. 3B, where appropriate.

Figure 3C:
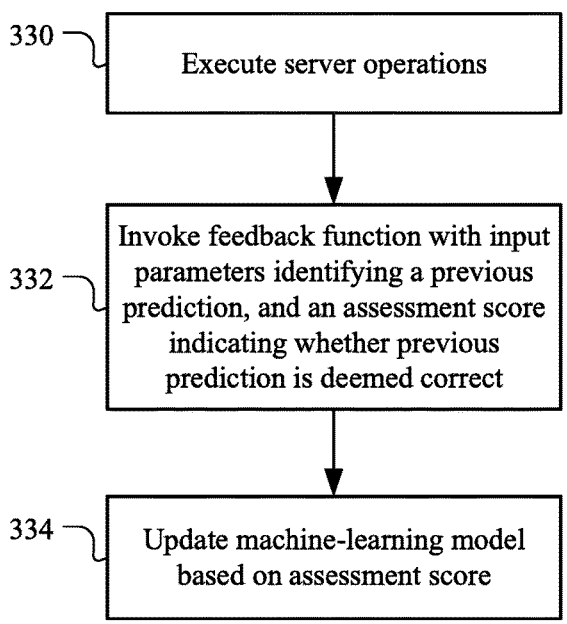
FIG. 3C illustrates an example method for updating a machine-learning model based on feedback data for a previous prediction.

FIG. 3C illustrates an example method 303 for updating a machine-learning model based on feedback data for a previous prediction. The method may begin at step 330, where the method may execute server operations. At step 332, the method may invoke a feedback function with input parameters identifying a previous prediction, and an assessment score indicating whether previous prediction is deemed correct. For example, the prediction may be deemed correct if there has been at least one cache hit on the object in the cache since the prediction was generated. At step 334, the method may update the machine-learning model based on assessment score. At step 334, the method may update, e.g., train the machine-learning model based on assessment score. Particular embodiments may repeat one or more steps of the method of FIG. 3C, where appropriate.

Figure 4A:
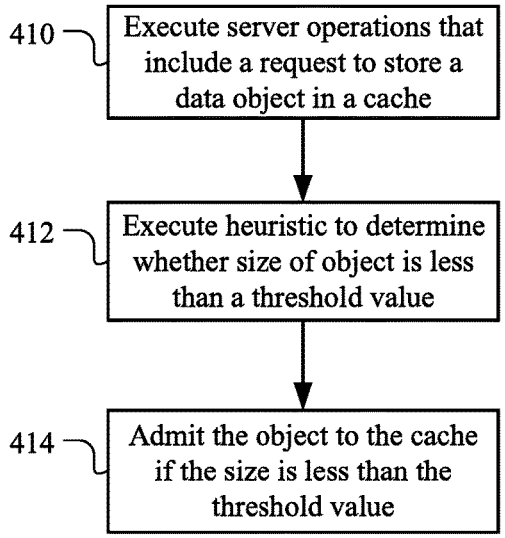
FIG. 4A illustrates an example method for using a heuristic to determine whether to admit an object to a cache in a cache server.

FIG. 4A illustrates an example method 401 for using a heuristic to determine whether to admit an object to a cache in a cache server. The method may begin at step 410, where the method may execute server operations that include a request to store a data object in a cache. At step 412, the method may execute a heuristic to determine whether size of object is less than a threshold value. The size of the object and the threshold value may be input feature values for the heuristic. At step 414, the method may admit the object to the cache if the size is less than the threshold value. Particular embodiments may repeat one or more steps of the method of FIG. 4A, where appropriate.

Figure 4B:
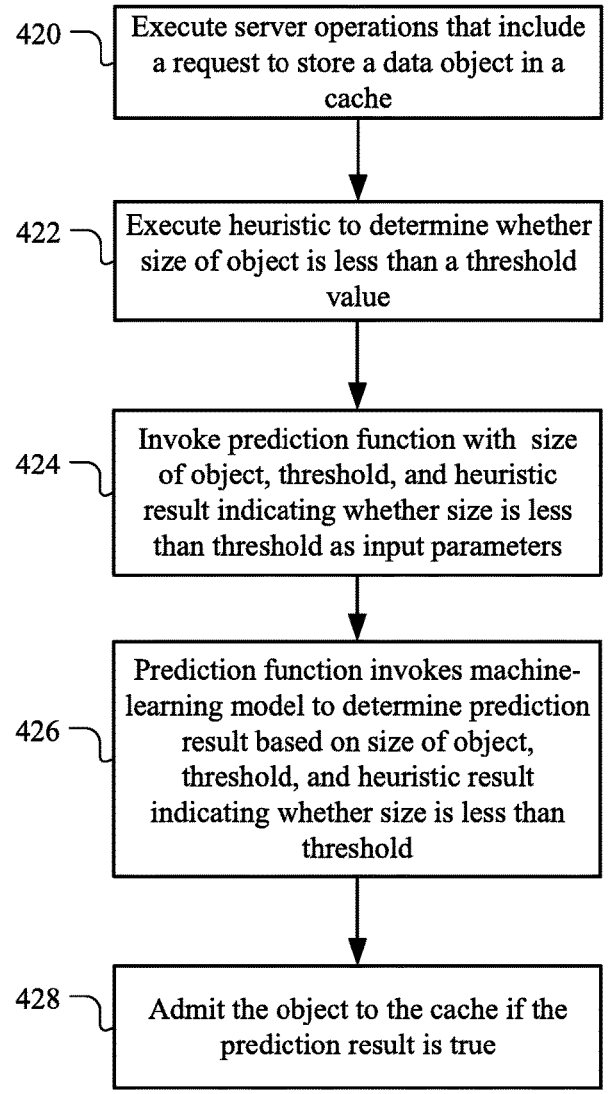
FIG. 4B illustrates an example method for using a prediction to determine whether to admit an object to a cache in a cache server.

FIG. 4B illustrates an example method 402 for using a prediction to determine whether to admit an object to a cache in a cache server. The method 402 may be implemented by program code that has been modified to invoke a prediction function provided by a machine-learning engine. The method may begin at step 420, where the method may execute server operations that include a request to store a data object in a cache. At step 422, the method may execute a heuristic to determine whether size of object is less than a threshold value. The size of the object and the threshold value may be input feature values for the heuristic prediction. Step 422 may execute the same heuristic that is executed at step 412 of FIG. 4A.

At step 424, the method may invoke the prediction function provided by a machine-learning engine with the size of the object, the threshold value, and the heuristic result indicating whether size is less than threshold as input parameters. At step 426, the method may invoke the prediction function, which may invoke machine-learning model to determine a prediction result based on the size of object, the threshold, and the heuristic result indicating whether size is less than threshold. At step 428, the method may admit the object to the cache if the prediction result determined in step 426 is true, e.g., indicates that the object is to be admitted to the cache. Particular embodiments may repeat one or more steps of the method of FIG. 4B, where appropriate.

Figure 4C:
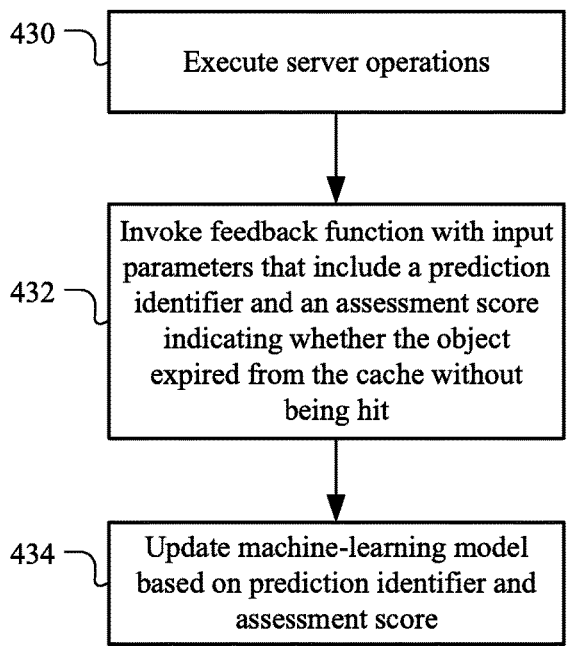
FIG. 4C illustrates an example method for updating a machine-learning model based on feedback data for a previous cache admission prediction.

FIG. 4C illustrates an example method 403 for updating a machine-learning model based on feedback data for a previous cache admission prediction. The method may begin at step 430, where the method may execute server operations. At step 432, the method may Invoke feedback function with input parameters that include a prediction identifier and an assessment score indicating whether the object expired from the cache without being hit (e.g., without being accessed). The prediction identifier may have been returned as an output value of the prediction function invoked at step 426 of FIG. 4B. The assessment score may be a numeric value indicating how effective the prediction at step 426 was. For example, if the object expired from the cache without being hit, and the prediction indicated that the object should be admitted to the cache, then the score may be 0 to indicate that the prediction was not effective (e.g., not correct). Alternatively, if the object was hit (e.g., accessed) in the cache prior to expiring and prior to the execution of step 432, then the score may be 100 to indicate that the prediction was effective. Other scores may be used to indicate different levels of effectiveness, e.g., if the object was retrieved only once, the score may be 5, whereas if the object was retrieved 200 times the score may be 50, and if the object was retrieved 10000 times the score may be 100. At step 434, the method may update the machine-learning model based on prediction identifier and assessment score.

The model update may be performed online, e.g., on the server, or offline, e.g., on a different computer system. Offline updates may be performed by, e.g., storing the feedback information, such as the prediction identifier and the score, in a file or database, or otherwise communicating the feedback information to another computer system. The other computer system may update the model, e.g., using reinforcement learning techniques, and communicate the updated model to the server. Eventually, the server may begin using the updated model for subsequent predictions. Particular embodiments may repeat one or more steps of the method of FIG. 4C, where appropriate.

Figure 5:
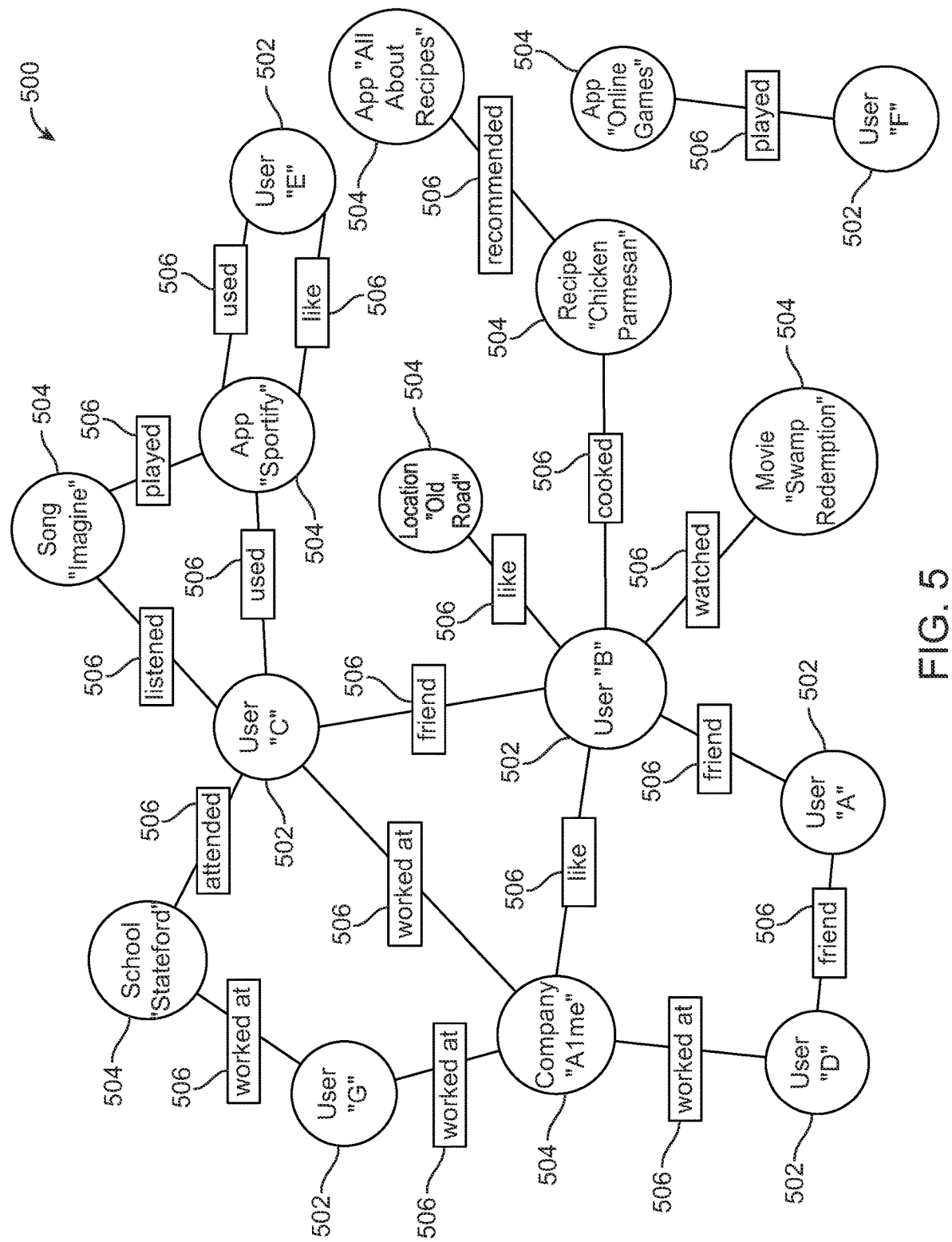
FIG. 5 illustrates an example social graph.

FIG. 5 illustrates example social graph 500. In particular embodiments, social-networking system 160 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 160, client system 130, or third-party system 170 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 160. In particular embodiments, a user node 502 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 506 connecting the first user's user node 502 to the second user's user node 502 in social graph 500 and store edge 506 as social-graph information in one or more of data stores 164. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 160 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 160 may create a "played" edge 506 (as illustrated in FIG. 5) between concept nodes 504 corresponding to the song and the application to indicate that the particular song was played by the particular application. In this case, "played" edge 506 corresponds to an action performed by an external application on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504).

In particular embodiments, social-networking system 160 may create an edge 506 between a user node 502 and a concept node 504 in social graph 500. As an example and not by way of limitation, a user viewing a concept-profile page (such as, for example, by using a web browser or a special-purpose application hosted by the user's client system 130) may indicate that he or she likes the concept represented by the concept node 504 by clicking or selecting a "Like" icon, which may cause the user's client system 130 to send to social-networking system 160 a message indicating the user's liking of the concept associated with the concept-profile page. In response to the message, social-networking system 160 may create an edge 506 between user node 502 associated with the user and concept node 504, as illustrated by "like" edge 506 between the user and concept node 504. In particular embodiments, social-networking system 160 may store an edge 506 in one or more data stores. In particular embodiments, an edge 506 may be automatically formed by social-networking system 160 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Figure 6:
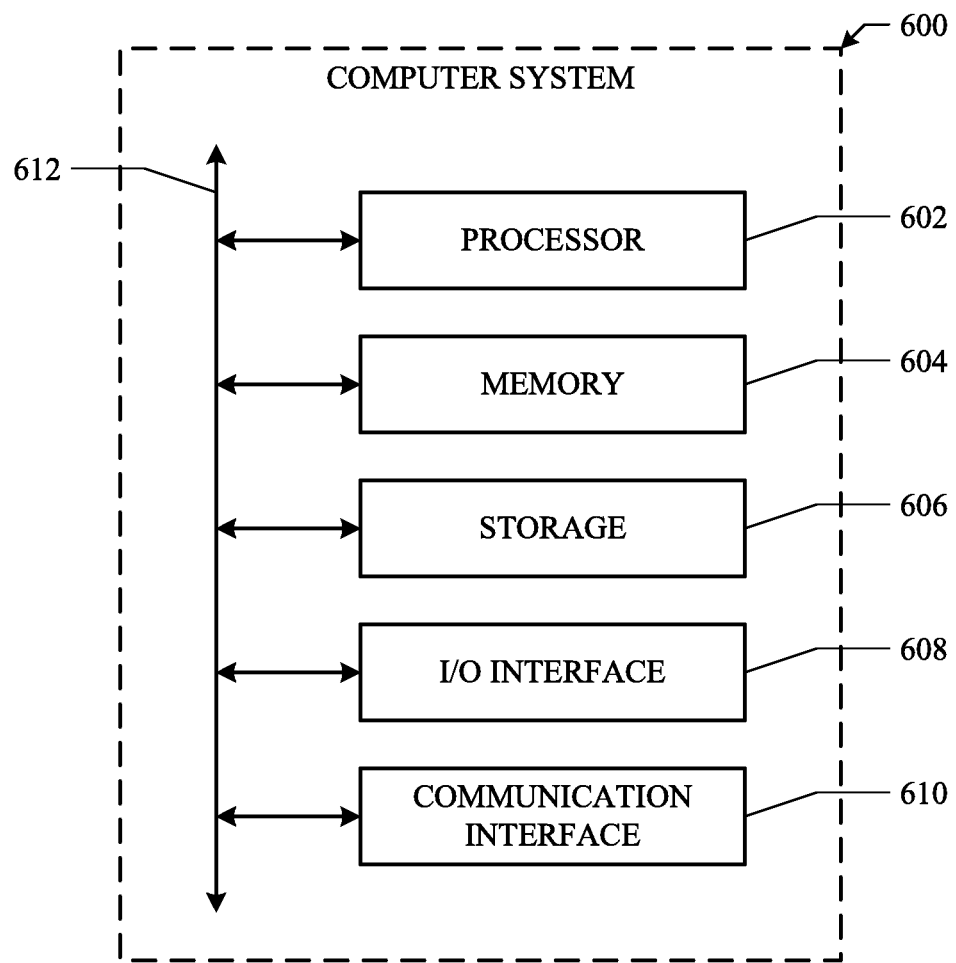
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface. [82] In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface. [83] In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect. [84] Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate. [85] Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. [86] The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, receiving a request to determine whether to perform an action for processing a data item, wherein the action is based on one or more feature values associated with the data item;
   by the computing device, generating a prediction of whether to perform the action, wherein the prediction is generated using a machine-learning model that is trained based on the feature values, a heuristic value based on the feature values, and one or more feedback scores based on corresponding past predictions generated by the machine-learning model,
   wherein the heuristic value indicates whether to perform the action based on one or more predetermined conditions that are based on the feature values;
   by the computing device, determining, based on a processor utilization level and a number of available processors, whether resources on the computing device are available for updating the machine-learning model; and
   by the computing device based on the determination,
      updating the machine-learning model online while the computing device performs other operations when resources on the computing device are available, wherein the resources on the computing device being available indicates the processor utilization level is above a threshold level and the number of available processors is greater than a threshold number, and
      updating the machine-learning model offline based on backpropagation using low-overhead upgrade operations when resources on the computing device are not available, wherein the resources on the computing device being not available indicates the processor utilization level is not above the threshold level and the number of available processors is not greater than the threshold number.

2. The method of claim 1, further comprising receiving a feedback score that indicates a level of effectiveness of the prediction, wherein updating the machine-learning model online comprises:
   by the computing device, generating one or more online updates for the machine-learning model based on the feedback score, the feature values, and the heuristic value; and
   by the computing device, updating the machine-learning model in accordance with the online updates.

3. The method of claim 1, wherein determining whether resources on the computing device are available for updating the machine-learning model comprises determining whether a resource availability condition is satisfied, and wherein the resource availability condition is based on one or more of: a minimum time interval between updates to the machine-learning model, the processor utilization level, or the number of available processors of the computing device.

4. The method of claim 1, wherein the updating the machine-learning model offline comprises:
   by the computing device, sending the feedback score, the feature values, and the heuristic value to a remote system, wherein the remote system generates one or more offline updates to the machine-learning model based on the feedback score, the feature values, and the heuristic.

5. The method of claim 4, wherein the sending occurs when a resource availability condition is not satisfied.

6. The method of claim 4, further comprising:
   by the computing device, receiving the offline updates to the machine-learning model from the remote system; and
   by the computing device, updating the machine-learning model based on the offline updates.

7. The method of claim 1, wherein the machine-learning model comprises a reinforcement model.

8. The method of claim 1, wherein the action comprises admitting an object to a cache, and the feature values comprise one or more attributes of the object.

9. The method of claim 8, wherein the feedback score is based on a number of requests received for the object since the object was admitted to the cache.

10. The method of claim 1, wherein the action comprises invalidating a cache entry, and the feature values comprise one or more attributes of the cache entry.

11. The method of claim 10, further comprising receiving a feedback score that indicates a level of effectiveness of the prediction, wherein the feedback score is based on a number of requests received for the cache entry since the cache entry was invalidated.

12. The method of claim 1, wherein updating the machine-learning model online comprises:
   updating the machine-learning model on the computing device while the computing device is operational.

13. One or more computer-readable non-transitory storage media embodying software that is operable when executed to:
   by a computing device, receive a request to determine whether to perform an action for processing a data item, wherein the action is based on one or more feature values associated with the data item;
   by the computing device, generate a prediction of whether to perform the action, wherein the prediction is generated using a machine-learning model that is trained based on the feature values, a heuristic value based on the feature values, and one or more feedback scores based on corresponding past predictions generated by the machine-learning model,
wherein the heuristic value indicates whether to perform the action based on one or more predetermined conditions that are based on the feature values;
by the computing device, determine, based on a processor utilization level and a number of available processors, whether resources on the computing device are available for updating the machine-learning model; and
by the computing device based on the determination,
update the machine-learning model online while the computing device performs other operations when resources on the computing device are available, wherein the resources on the computing device being available indicates the processor utilization level is above a threshold level and the number of available processors is greater than a threshold number, and
update the machine-learning model offline based on backpropagation using low-overhead upgrade operations when resources on the computing device are not available, wherein the resources on the computing device being not available indicates the processor utilization level is not above the threshold level and the number of available processors is not greater than the threshold number.

14. The media of claim 13, wherein the software is further operable when executed to receive a feedback score that indicates a level of effectiveness of the prediction, wherein updating the machine-learning model online comprises:
generating one or more online updates for the machine-learning model based on the feedback score, the feature values, and the heuristic value; and
updating the machine-learning model in accordance with the online updates.

15. The media of claim 13, wherein determining whether resources on the computing device are available for updating the machine-learning model comprises determining whether a resource availability condition is satisfied, and wherein the resource availability condition is based on one or more of: a minimum time interval between updates to the machine-learning model, the processor utilization level, or the number of available processors of the computing device.

16. The media of claim 13, wherein to update the machine-learning model offline the software is further operable when executed to:
send the feedback score, the feature values, and the heuristic value to a remote system, wherein the remote system generates one or more offline updates to the machine-learning model based on the feedback score, the feature values, and the heuristic.

17. The media of claim 16, wherein the sending occurs when a resource availability condition is not satisfied.

18. A system comprising:
one or more processors; and
one or more computer-readable non-transitory storage media coupled to one or more of the processors and comprising instructions operable when executed by one or more of the processors to cause the system to:
receive a request to determine whether to perform an action for processing a data item, wherein the action is based on one or more feature values associated with the data item;
generate a prediction of whether to perform the action, wherein the prediction is generated using a machine-learning model that is trained based on the feature values, a heuristic value based on the feature values, and one or more feedback scores based on corresponding past predictions generated by the machine-learning model,
wherein the heuristic value indicates whether to perform the action based on one or more predetermined conditions that are based on the feature values;
determine, based on a processor utilization level and a number of available processors, whether resources on the computing device are available for updating the machine-learning model; and
based on the determination,
update the machine-learning model online while the computing device performs other operations when resources on the computing device are available, wherein the resources on the computing device being available indicates the processor utilization level is above a threshold level and the number of available processors is greater than a threshold number, and
update the machine-learning model offline based on backpropagation using low-overhead upgrade operations when resources on the computing device are not available, wherein the resources on the computing device being not available indicates the processor utilization level is not above the threshold level and the number of available processors is not greater than the threshold number.

19. The system of claim 18, wherein the processors are further operable when executed to receive a feedback score that indicates a level of effectiveness of the prediction, wherein updating the machine-learning model online comprises:
generating one or more online updates for the machine-learning model based on the feedback score, the feature values, and the heuristic value; and
updating the machine-learning model in accordance with the online updates.

20. The system of claim 18, wherein determining whether resources on the one or more of the processors are available for updating the machine-learning model comprises determining whether a resource availability condition is satisfied, and wherein the resource availability condition is based on one or more of: a minimum time interval between updates to the machine-learning model, the processor utilization level, or the number of available processors of the computing device.

21. The system of claim 18, wherein to update the machine-learning model offline the processors are further operable when executing the instructions to:
send the feedback score, the feature values, and the heuristic value to a remote system, wherein the remote system generates one or more offline updates to the machine-learning model based on the feedback score, the feature values, and the heuristic.

* * * * *